(12) United States Patent
Sugimoto (10) Patent No.: US 11,513,344 B2
(45) Date of Patent: Nov. 29, 2022

(54) SENSOR AND MEASUREMENT APPARATUS FOR WAVEFRONT OF LIGHT FROM OPTICAL ELEMENT, AND METHOD OF MANUFACTURING OPTICAL ELEMENT AND OPTICAL SYSTEM

(71) Applicant: CANON KABUSHIKI KAISHA, Tokyo (JP)

(72) Inventor: Tomohiro Sugimoto, Yoshikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 788 days.

(21) Appl. No.: 16/416,894

(22) Filed: May 20, 2019

(65) Prior Publication Data
US 2019/0361226 A1 Nov. 28, 2019

(30) Foreign Application Priority Data
May 25, 2018 (JP) .............................. JP2018-101008

(51) Int. Cl.
*G01J 9/00* (2006.01)
*G02B 26/12* (2006.01)
(Continued)

(52) U.S. Cl.
CPC .............. *G02B 26/123* (2013.01); *G01J 9/00* (2013.01); *G02B 3/0056* (2013.01);
(Continued)

(58) Field of Classification Search
CPC .............. G02B 27/0025; G02B 26/123; G02B 5/1885; G02B 2027/014; G02B 13/16;
(Continued)

(56) References Cited

U.S. PATENT DOCUMENTS

| 5,936,720 A | 8/1999 | Neal |
| 8,508,725 B2 | 8/2013 | Kato |

(Continued)

FOREIGN PATENT DOCUMENTS

| JP | 2011-117897 A | 6/2011 |
| JP | 2012533758 A | 12/2012 |

(Continued)

OTHER PUBLICATIONS

Tae Moon Jeong, Manoj Menon, and Geunyoung Yoon, "Measurement of wave-front aberration in soft contact lenses by use of a Shack-Hartmann wave-front sensor," Jul. 20, 2005, Optica Publishing Group, Appl. Opt. 44, pp. 4523-4527. (Year: 2005).*

(Continued)

*Primary Examiner* — Seung C Sohn
*Assistant Examiner* — Erin R Garber
(74) *Attorney, Agent, or Firm* — Canon U.S.A., Inc. IP Division (57) ABSTRACT

A wavefront sensor includes a splitting element configured to split an incident light beam into a plurality of light beams, an image sensor configured to receive the plurality of light beams, and a processing unit configured to calculate a wavefront of the incident light beam based on an intensity (Continued)

distribution of the plurality of light beams received by the image sensor. The splitting element is either in direct contact with the image sensor or in contact with the image sensor via a plate glass. In the calculation of the wavefront, the processing unit corrects a relative positional deviation between the splitting element and the image sensor by calculating a rotation about a rotation axis.

17 Claims, 6 Drawing Sheets

(51) Int. Cl.
    *G02B 13/16*     (2006.01)
    *G02B 5/18*     (2006.01)
    *G02B 3/00*     (2006.01)
    *G01M 11/02*     (2006.01)

(52) U.S. Cl.
    CPC ........... *G02B 5/1885* (2013.01); *G02B 13/16* (2013.01); *G01J 2009/002* (2013.01); *G01M 11/0292* (2013.01)

(58) Field of Classification Search
    CPC ........... G02B 21/0032; G02B 27/0068; G02B 21/361; G01J 9/00; G01J 2009/002; G01J 1/0411; G01B 9/02055; G01B 9/02032; G01B 9/02072; G01B 9/02038; G01M 11/0292; G01M 11/02; G01M 11/0271
    See application file for complete search history.

(56) References Cited

U.S. PATENT DOCUMENTS

| | | | |
|---|---|---|---|
| 2005/0046857 A1* | 3/2005 | Bingham | G01B 11/0675 356/457 |
| 2016/0011336 A1* | 1/2016 | Takakuwa | G02B 5/223 427/160 |

FOREIGN PATENT DOCUMENTS

| | | | | |
|---|---|---|---|---|
| JP | 2015210241 A | * | 11/2015 | |
| WO | 2010/058193 A2 | | 5/2010 | |
| WO | WO-2010058193 A2 | * | 5/2010 | ............... G01J 1/42 |
| WO | 2010/058193 A3 | | 9/2010 | |

OTHER PUBLICATIONS

Pfund, et al., Misalignment effects of the Shack-Hartmann sensor, Applied Optics, vol. 37, No. 1, XP-002322182, Jan. 1998, pp. 22-27.

* cited by examiner

SENSOR AND MEASUREMENT APPARATUS FOR WAVEFRONT OF LIGHT FROM OPTICAL ELEMENT, AND METHOD OF MANUFACTURING OPTICAL ELEMENT AND OPTICAL SYSTEM

BACKGROUND OF THE INVENTION

Field of the Invention

The present invention relates to a wavefront sensor configured to measure a wavefront of an optical element or optical system.

Description of the Related Art

A wavefront sensor such as a Shack-Hartmann sensor or Talbot interferometer is used to measure a wavefront of transmission light or reflection light of an optical element or optical system. The wavefront sensor includes a light flux splitting element (two-dimensional microlens array or two-dimensional diffraction grating) and an image sensor (complementary metal oxide semiconductor (CMOS) sensor or charge-coupled device (CCD) sensor). The light flux splitting element splits a light flux into a plurality of light beams, and the image sensor receives the plurality of light beams. The measurement accuracy of the wavefront sensor depends on the relative positional accuracy between the light flux splitting element and the image sensor.

Japanese Unexamined Patent Application Publication (Translation of PCT Application) No. 2012-533758 discusses a wavefront sensor provided with a mechanism for precisely adjusting the relative positions of the light flux splitting element and the image sensor.

The wavefront sensor discussed in Japanese Unexamined Patent Application Publication (Translation of PCT Application) No. 2012-533758 presupposes the precise adjustment of the relative positions of the light flux splitting element and the image sensor. The mechanism and process for precise adjustment increase the cost of the wavefront sensor.

SUMMARY OF THE INVENTION

The present invention is directed to a low-cost wavefront sensor realized without using a mechanism and process for precise adjustment of a light flux splitting element and an image sensor.

According to an aspect of the present invention, a wavefront sensor includes a splitting element configured to split an incident light beam into a plurality of light beams, an image sensor configured to receive the plurality of light beams, and a processing unit configured to calculate a wavefront of the incident light beam based on an intensity distribution of the plurality of light beams received by the image sensor, wherein the splitting element is either in direct contact with the image sensor or in contact with the image sensor via a plate glass, and wherein, in the calculation of the wavefront, the processing unit corrects a relative positional deviation between the splitting element and the image sensor by calculating a rotation about a rotation axis.

Further features of the present invention will become apparent from the following description of exemplary embodiments with reference to the attached drawings.

DESCRIPTION OF THE EMBODIMENTS

Various exemplary embodiments of the present invention will be described below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
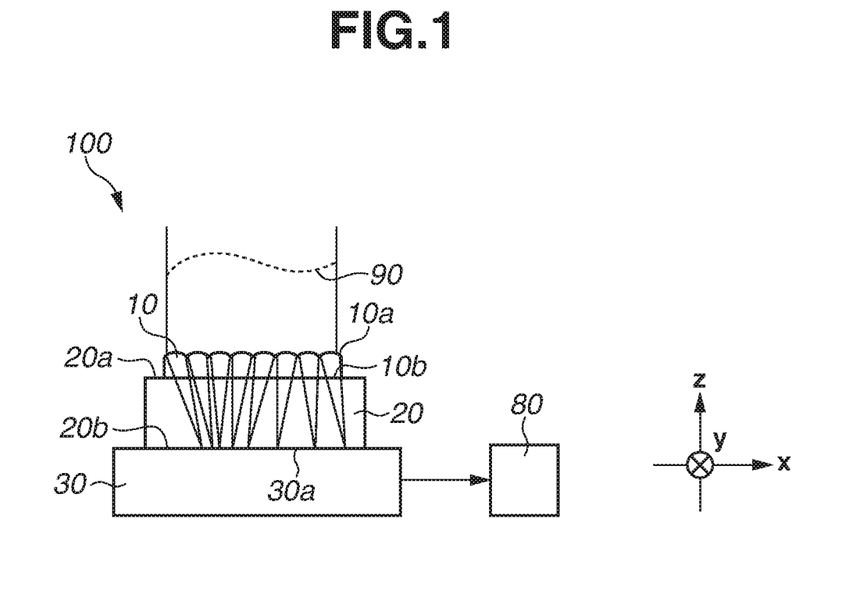
FIG. 1 illustrates a schematic structure of a wavefront sensor according to a first exemplary embodiment.

FIG. 1 illustrates a schematic structure of a wavefront sensor 100 according to a first exemplary embodiment of the present invention. The wavefront sensor 100 includes a light flux splitting element (splitting element, microlens array) 10, a reference plate glass (plate glass) 20, an image sensor (e.g., complementary metal oxide semiconductor (CMOS) sensor or charge-coupled device (CCD) sensor) 30, and an arithmetic processing unit (a processing unit, computer) 80. The image sensor 30 includes a surface 30a (which is a light reception portion in the present exemplary embodiment), and x- and y-axes are defined in a horizontal direction and a z-axis is defined in a perpendicular direction with respect to the surface 30a. The directions of the x- and y-axes correspond to a two-dimensional arrangement direction of pixels of the image sensor 30. The surface 30a of the image sensor 30 is at the position z=0.

The light flux splitting element 10 includes a surface (first surface) 10a on a light-incident side and a surface (second surface) 10b on a light-exiting side (a light-emission side). The surface 10a has a lens structure (light flux splitting function), and the surface 10b is a flat surface. The reference plate glass 20 includes a surface (first surface) 20a on the light-incident side and a surface (second surface) 20b on the light-exiting side. The first surface 20a and the second surface 20b are both flat surfaces and are parallel to each other (an angle formed by the first surface 20a and the second surface 20b is 0.005 degrees or less). The second surface 10b of the light flux splitting element 10 and the first surface 20a of the reference plate glass 20 are in contact with each other, and the second surface 20b of the reference plate glass 20 and the surface 30a of the image sensor 30 are in contact with each other. Specifically, the light flux splitting element 10 and the image sensor 30 are in contact with each other via the reference plate glass 20.

A thickness $T_m$ and a refractive index $N_m$ of the light flux splitting element 10 and a thickness $T_p$ and a refractive index $N_p$ of the reference plate glass 20 are selected in such a manner that a light-condensing point of each lens of the light flux splitting element 10 is formed substantially on the surface 30a of the image sensor 30 when parallel light is incident on the wavefront sensor 100. For example, the thickness $T_m$ and the refractive index $N_m$ of the light flux splitting element 10 and the thickness $T_p$ and the refractive index $N_p$ of the reference plate glass 20 are selected so as to satisfy a following equation 1.

$$f = \frac{T_m}{N_m} + \frac{T_p}{N_p} \quad (1)$$

In the equation 1, f is the focal length of each lens of the light flux splitting element 10.

The wavefront sensor 100 does not include a mechanism for precise adjustment of the relative positions of the light flux splitting element 10 and the image sensor 30. Further, the wavefront sensor 100 is assembled simply by fixing the light flux splitting element 10, the reference plate glass 20, and the image sensor 30 with a jig (not illustrated) or bonding agent in such a manner that the light flux splitting element 10, the reference plate glass 20, and the image sensor 30 are in contact with each other, without a precise adjustment process. In the case of using a bonding agent, the bonding agent is applied not to the contact surfaces of the elements (surfaces 10b and 20a, surfaces 20b and 30a) but to side surfaces (surfaces through which light does not transmit). Alternatively, the surfaces can be joined together by optical contact bonding instead of using a bonding agent.

In the present exemplary embodiment, the light flux splitting element 10 and the image sensor 30 are in contact with the reference plate glass 20 so that the relative positions of the light flux splitting element 10 and the image sensor 30 in the z-direction are determined with great accuracy. Specifically, the distant between the first surface 10a of the light flux splitting element 10 and the surface 30a of the image sensor 30 is constant. Thus, a conventionally-conducted process of precisely adjusting the relative positions in the z-direction is no longer needed. Meanwhile, a microlens arrangement direction of the light flux splitting element 10 and a pixel arrangement direction of the image sensor 30 (=x-direction, y-direction) do not correspond due to an effect of the elimination of the precise adjustment process. Specifically, the microlens arrangement direction of the light flux splitting element 10 is rotated about the z-axis (which is an axis orthogonal to the imaging surface 30a of the image sensor 30) with respect to the pixel arrangement direction of the image sensor 30. A relative position error originating from the rotation about the z-axis (specific axis, rotation axis) is corrected by an arithmetic process, described below, carried out by the arithmetic processing unit (processing unit) 80.

If a test light beam 90 having a wavefront W(x, y) is incident on the wavefront sensor 100, light-condensing spots corresponding to a wavefront shape are formed on the surface 30a of the image sensor 30 as illustrated in FIG. 1. The test light beam 90 is a light beam from a test object (transmitted through the test object or reflected by the test object). Then, the image sensor 30 receives an intensity distribution of the light-condensing spots (intensity distribution of a plurality of light beams). Data on the intensity distribution received by the image sensor 30 is transmitted to the computer (arithmetic processing unit/processing unit) 80, and coordinates of the gravity centers of the respective light-condensing spots are calculated. A relation expressed by an equation 2 as below is satisfied, where $(X_{ij}, Y_{ij}, T_m+T_p)$ are the coordinates of the microlenses of the light flux splitting element 10 that is positioned at the i-th row and the j-th column, and $(X_{ij}+\delta X_{ij}, Y_{ij}+\delta X_{ij}, 0)$ are the coordinates of the gravity center of a light-condensing spot formed by the microlens. In the equation 2, $\varphi_{xij}$ and $\varphi_{yij}$ are angles of incidence on the microlens in the x-direction and y-direction, respectively.

$$\frac{d}{dx}W(X_{ij}, Y_{ij}) = \tan\varphi_{xij} \quad (2)$$

$$\frac{d}{dy}W(X_{ij}, Y_{ij}) = \tan\varphi_{yij}$$

$$\delta X_{ij} = T_m \frac{\sin\varphi_{xij}}{\sqrt{N_m^2 - \sin^2\varphi_{xij}}} + T_p \frac{\sin\varphi_{xij}}{\sqrt{N_p^2 - \sin^2\varphi_{xij}}}$$

$$\delta Y_{ij} = T_m \frac{\sin\varphi_{yij}}{\sqrt{N_m^2 - \sin^2\varphi_{yij}}} + T_p \frac{\sin\varphi_{yij}}{\sqrt{N_p^2 - \sin^2\varphi_{yij}}}$$

If the angle of light incident on the microlens is small, the equation 2 can approximately be deformed into a following equation 3 using the equation 1.

$$\frac{d}{dx}W(X_{ij}, Y_{ij}) = \frac{\delta X_{ij}}{f} \quad (3)$$

$$\frac{d}{dy}W(X_{ij}, Y_{ij}) = \frac{\delta Y_{ij}}{f}$$

It is assumed that the microlens arrangement direction of the light flux splitting element 10 substantially coincides with the pixel arrangement direction of the image sensor 30 (i.e., a case in which precise adjustment is performed as in a conventional technique). At this time, the coordinates $X_{ij}$ and $Y_{ij}$ of the microlenses of the light flux splitting element 10 are values that are arranged at a period (e.g., $\Lambda=150$ μm) of the microlenses of the light flux splitting element 10 in the x- and y-directions, respectively, as expressed by an equation 4.

$$X_{ij} = \Lambda j + a$$

$$Y_{ij} = \Lambda i + b \quad (4)$$

In the equation 4, a is an offset constant number of the x-coordinate, and b is an offset constant number of the y-coordinate. Meanwhile, in the present exemplary embodiment, the microlens arrangement direction of the light flux splitting element 10 is rotated about the z-axis (specific axis) with respect to the pixel arrangement direction of the image sensor 30, so that correction is needed as expressed by an equation 5.

$$\begin{pmatrix} X_{ij} \\ Y_{ij} \end{pmatrix} = \begin{pmatrix} \cos\theta_z & -\sin\theta_z \\ \sin\theta_z & \cos\theta_z \end{pmatrix} \begin{pmatrix} \Lambda j + a \\ \Lambda i + b \end{pmatrix} \quad (5)$$

In the equation 5, $\theta_z$ is a relative position error originating from the rotation about the z-axis. The amount of $\theta_z$ is calculated in advance from the arrangement of the coordinates of the gravity centers of the light-condensing spots measured by the image sensor 30 when parallel light enters the wavefront sensor 100. The wavefront W(x, y) of the test light beam is calculable using the equation 5 in combination with the equation 2 or 3. There is a case in which the value of $\theta_z$ is incidentally small without precise adjustment. In this case, the equation 4 can be used in place of the equation 5.

As described above, in the present exemplary embodiment, the light flux splitting element 10 and the image sensor 30 are disposed to be in contact with the reference plate glass 20, whereby the relative positions of the light flux splitting element 10 and the image sensor 30 in the z-direction are determined with great accuracy. Further, the relative position error originating from the rotation about the z-axis (specific axis) is corrected by arithmetic (performed by the arithmetic processing unit (processing unit) 80) as expressed by the equation 5, whereby a mechanism and process for precise adjustment are no longer needed and a low-cost wavefront sensor is realized. In other words, in the present embodiment, the arithmetic processing unit 80 is configured to calculate a wavefront of an incident light beam based on an intensity distribution of the plurality of light beams received by the image sensor 30, and in the calculation of the wavefront, the arithmetic processing unit 80 corrects a relative positional deviation between the splitting element 10 and the image sensor 30 by calculating a rotation about the rotation axis. Furthermore, the present exemplary embodiment also has an advantage described below.

In a conventional fixing method in which a portion (≡peripheral portion) outside an effective region of the light flux splitting element 10 is held, a non-linear distribution may occur in the distance between the light flux splitting element 10 and the image sensor 30 in the z-direction due to an influence of a self-weight deformation, deformation under stress, or deformation under thermal expansion/contraction of the light flux splitting element 10. The non-linear distribution is, for example, a distribution similar to a quadratic function (which may include higher-order functions) that is concave or convex at the center of the effective region. On the other hand, in the present exemplary embodiment, the above-described non-linear distribution is prevented because the entire effective region of the light flux splitting element 10 is supported by the reference plate glass 20. Specifically, a robust wavefront sensor is realized.

While it is assumed that the refractive index $N_m$ of the light flux splitting element 10 and the refractive index $N_p$ of the reference plate glass 20 are different (i.e., materials of the light flux splitting element 10 and of the reference plate glass 20 are different), the refractive index $N_m$ of the light flux splitting element 10 and the refractive index $N_p$ of the reference plate glass 20 (materials of the light flux splitting element 10 and the reference plate glass 20) can be the same. The equations in this case are the equations obtained by substituting $T_m+T_p$ into $T_m$ and zero into $T_p$ in the equations 2 and 3. If the light flux splitting element 10 having a thickness of $T_m+T_p$ can be manufactured, the reference plate glass 20 can be eliminated. In this case, the light flux splitting element 10 and the image sensor 30 are in direct contact with each other. In general, a microlens array manufactured by photolithography has a thickness of about 1 mm. In order to eliminate the reference plate glass 20 by increasing the thickness of the light flux splitting element 10, for example, a microlens array having a thickness of about 7.5 mm or less (seven to eight times a conventional thickness) needs to be prepared in a case in which the focal length f of the microlens is 5 mm or less and the refractive index $N_m$ of the microlens array is 1.5 or less.

While the first surface 10a of the light flux splitting element 10 has the lens structure and the second surface 10b has the flat surface in the present exemplary embodiment, the first surface 10a can have a flat surface and the second surface 10b can have a lens structure (or the first surface 10a and the second surface 10b can both have a lens structure). In this case, the reference plate glass 20 that satisfies $f=T_p/N_p$ in place of the equation 1 needs to be prepared. Further, the equations 2 and 3 are the equations obtained by substituting zero into $T_m$.

In the present exemplary embodiment, an arithmetic of a rotation of the coordinates of the microlenses of the light flux splitting element 10 by $\theta_z$ is performed as expressed by the equation 5. Alternatively, deviation amounts $\delta X_{ij}$ and $\delta Y_{ij}$ of the coordinates of the gravity centers of the respective light-condensing spots can be rotated by $-\theta_z$.

In the present exemplary embodiment, a Shack-Hartmann sensor using the microlens array in the light flux splitting element 10 is employed as the wavefront sensor. Alternatively, a Hartmann sensor using a pin-hole array or a Talbot interferometer using a diffraction grating can be employed as the wavefront sensor. A wavefront recovery method can be the method of calculating the coordinates of the gravity centers of the respective light-condensing spots as in the present exemplary embodiment or a Fourier transform method.

Figure 2:
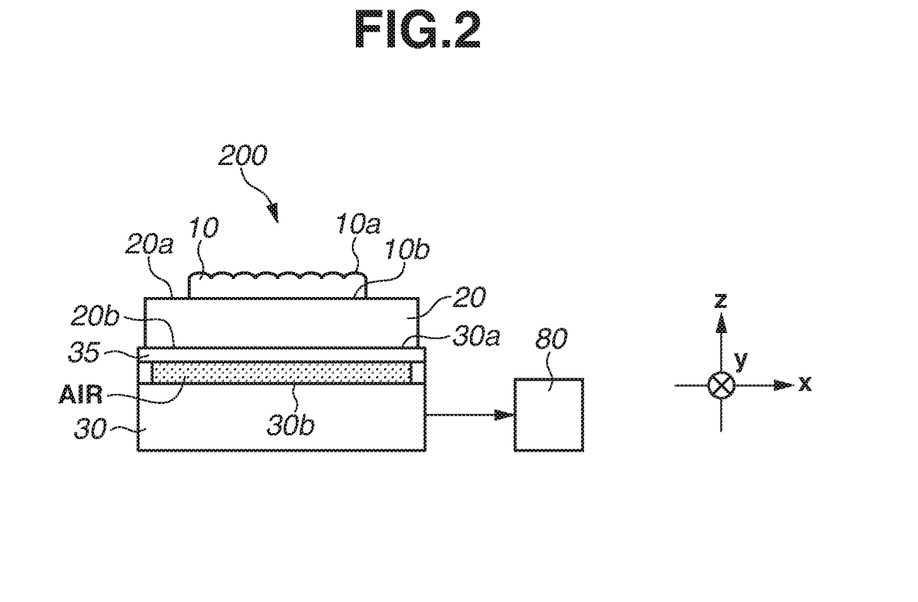
FIG. 2 illustrates a schematic structure of a wavefront sensor according to a second exemplary embodiment.

FIG. 2 illustrates a schematic structure of a wavefront sensor 200 according to a second exemplary embodiment of the present invention. A structure similar to that in the first exemplary embodiment is given the same reference numeral. The wavefront sensor 200 includes the light flux splitting element 10, the reference plate glass 20, the image sensor 30 including a cover glass 35, and the computer 80. In the present exemplary embodiment, the image sensor 30 and the cover glass 35 are collectively defined as the image sensor 30, and the surface 30a of the image sensor 30 refers to a surface of the cover glass (light transmission member) 35. Between the cover glass 35 and a light reception portion 30b of the image sensor 30 is an air layer.

The structure according to the present exemplary embodiment includes the cover glass 35 (thickness $T_c$, refractive index $N_c$) and the air (thickness $T_a$, refractive index 1) layer in addition to the structure according to the first exemplary embodiment (in FIG. 1), so that the equations corresponding to the equations 1 and 2 according to the first exemplary embodiment are equations 6 and 7 as below. In the structure according to the present exemplary embodiment, the wavefront of the test light beam is calculable using a combination of the equations 5 and 7 (or equation obtained by substituting f of the equation 6 into the equation 3).

$$f = \frac{T_m}{N_m} + \frac{T_p}{N_p} + \frac{T_c}{N_c} + T_a \tag{6}$$

$$\frac{d}{dx} W(X_{ij}, Y_{ij}) = \tan\varphi_{xij} \tag{7}$$

$$\frac{d}{dy} W(X_{ij}, Y_{ij}) = \tan\varphi_{yij}$$

$$\delta X_{ij} = T_m \frac{\sin\varphi_{xij}}{\sqrt{N_m^2 - \sin^2\varphi_{xij}}} +$$

$$T_p \frac{\sin\varphi_{xij}}{\sqrt{N_p^2 - \sin^2\varphi_{xij}}} + T_c \frac{\sin\varphi_{xij}}{\sqrt{N_c^2 - \sin^2\varphi_{xij}}} + T_a \tan\varphi_{xij}$$

$$\delta Y_{ij} = T_m \frac{\sin\varphi_{yij}}{\sqrt{N_m^2 - \sin^2\varphi_{yij}}} + T_p \frac{\sin\varphi_{yij}}{\sqrt{N_p^2 - \sin^2\varphi_{yij}}} +$$

$$T_c \frac{\sin\varphi_{yij}}{\sqrt{N_c^2 - \sin^2\varphi_{yij}}} + T_a \tan\varphi_{yij}$$

While the cover glass 35 is provided in front (positive z-axis direction) of the light reception portion 30b of the image sensor 30 in the present exemplary embodiment, a low-pass filter, an infrared-cut filter, or a plurality of combinations of the low-pass filter and the infrared-cut filter can be provided in place of the cover glass 35. In a case in which a layer having a thickness of $T_k$ and a refractive index of $N_k$ (k=1, 2, ..., M) is provided between the light flux splitting surface 10a (surface having a structure of a lens or diffraction grating) of the light flux splitting element 10 and the light reception portion 30b of the image sensor 30, the equations 6 and 7 are generalized as expressed by following equations 8 and 9.

$$f = \sum_{k=1}^{M} \frac{T_k}{N_k} \quad (8)$$

$$\frac{d}{dx} W(X_{ij}, Y_{ij}) = \tan\varphi_{xij} \quad (9)$$
$$\frac{d}{dy} W(X_{ij}, Y_{ij}) = \tan\varphi_{yij}$$

$$\delta X_{ij} = \sum_{k=1}^{M} T_k \frac{\sin\varphi_{xij}}{\sqrt{N_k^2 - \sin^2\varphi_{xij}}}$$

$$\delta Y_{ij} = \sum_{k=1}^{M} T_k \frac{\sin\varphi_{yij}}{\sqrt{N_k^2 - \sin^2\varphi_{yij}}}$$

In the above description, it is assumed that the cover glass 35 is attached parallel to the light reception portion 30b without a distortion in the image sensor 30. However, there can be a case in which the cover glass 35 is inaccurately attached as in a wavefront sensor 201 in FIG. 3, depending on the image sensor to be used. In this case, the light flux splitting element 10 and the reference plate glass 20 are inclined with respect to the light reception portion 30b of the image sensor 30 (i.e., a relative position error occurs due to the rotation about the x- and y-axes). In a case in which the area of the light flux splitting element 10 is, for example, about 15 mm×15 mm and the thickness of the reference plate glass 20 is, for example, about 5 mm, a portion formed by a set of the light flux splitting element 10 and the reference plate glass 20 is arranged with substantially no distortion. In a case in which the area of the light flux splitting element 10 is increased, a distortion can be prevented if the thickness of the reference plate glass 20 is also increased based on the area.

Figure 3:
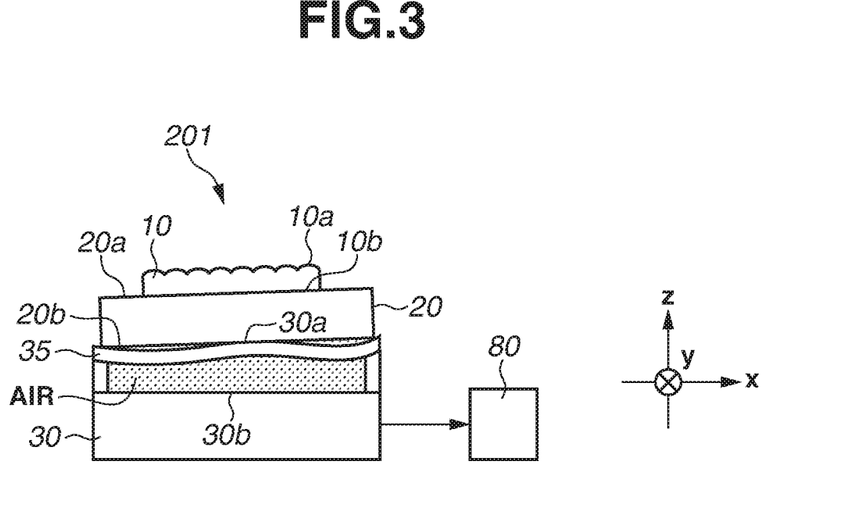
FIG. 3 illustrates a schematic structure of a wavefront sensor in a case in which a cover glass of an image sensor is distorted.

In the structure illustrated in FIG. 3, the thickness $T_m$ of the light flux splitting element 10, the thickness $T_p$ of the reference plate glass 20, and the thickness $T_c$ of the cover glass 35 at any position can be considered constant (the shape of the cover glass 35 is changed, but the thickness of the cover glass 35 is substantially constant) as in FIG. 2. On the other hand, the thickness of the air layer (the thickness is the sum of the thickness of the air layer between the cover glass 35 and the light reception surface 30b and the thickness of the air layer between the second surface 20b of the reference plate glass 20 and the surface 30a of the image sensor 30) has a distribution ($T_a=T_a(X_{ij}, Y_{ij})=T_{aij}$). If the thickness distribution $T_{aij}$ is ignored, a wavefront calculation error occurs. In a conventional technique, precise adjustment of the light flux splitting element 10 is performed in order to eliminate the above-described distribution. In the present exemplary embodiment, calculation for correction of the thickness of the air layer (arithmetic for correction by a rotation about the x- and y-axes as the specific axis) is performed, by the arithmetic processing unit (processing unit) 80, in place of the precise adjustment, whereby the conventional mechanism and process for precise adjustment are eliminated.

In the structure according to the present exemplary embodiment, it is considered that the set of the light flux splitting element 10 and the reference plate glass 20 is inclined without a distortion, so that the thickness distribution $T_{aij}$ of the air layer is approximated as a linearly-changing distribution as expressed by a following equation 10.

$$T_{aij} = T_a + AX_{ij} + BY_{ij} \quad (10)$$

In the equation 10, A and B are proportionality constants, and $T_a$ is a mean value of the thickness distribution of the air layer. The second and third items of the equation 10 indicate that a correction of a rotation by $\arctan(\sqrt{(A^2+B^2)})$ is added with respect to an axis (axis parallel to the surface 30a of the image sensor 30) rotated by $\arctan(B/A)$ from the y-axis in an x-y flat surface. The wavefront of the wavefront sensor 201 having the structure illustrated in FIG. 3 can be obtained by substituting $T_{aij}$ of the equation 10 into $T_a$ of the equation 7 and calculating the wavefront.

Figure 4:
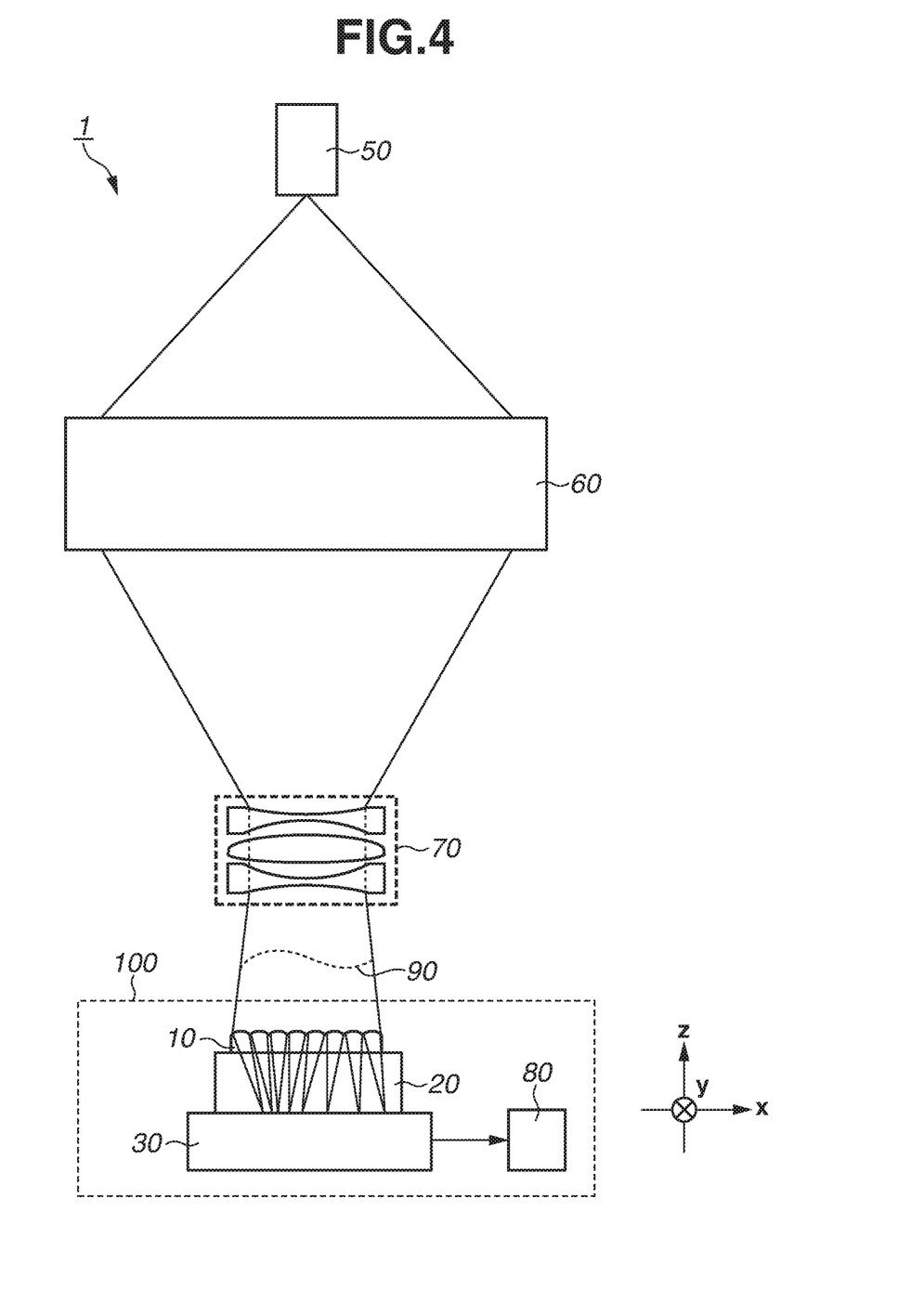
FIG. 4 illustrates a schematic structure of a wavefront measurement apparatus according to a third exemplary embodiment.

FIG. 4 illustrates a schematic structure of a wavefront measurement apparatus 1 using the wavefront sensor 100 according to the first exemplary embodiment. The wavefront measurement apparatus 1 includes a light source 50, a light projection system 60, and the wavefront sensor 100, and measures a wavefront of a test object 70. In the present exemplary embodiment, the test object 70 is an optical system including a combination of a plurality of optical elements or a single optical element.

Diverging light emitted from the light source 50 is converged after passing through the light projection system 60 and is incident on the test object 70. The light having transmitted through the test object 70 is incident on the wavefront sensor 100, and a wavefront aberration 90 of the test object 70 is measured. Such wavefront aberration measurement result can be used as feedback in the method of manufacturing an optical system or optical element. Further, examples of a light source that can be used as the light source 50 include a laser diode and a light-emitting diode (LED). The light projection system 60 includes, for example, a single lens, a plurality of lenses, or a computer-generated holography (CGH) lens. According to the present exemplary embodiment, a low-cost wavefront measurement apparatus is realized using a wavefront sensor realized without a mechanism and process for precise adjustment of the relative positions of a light flux splitting element and an image sensor.

Figure 5:
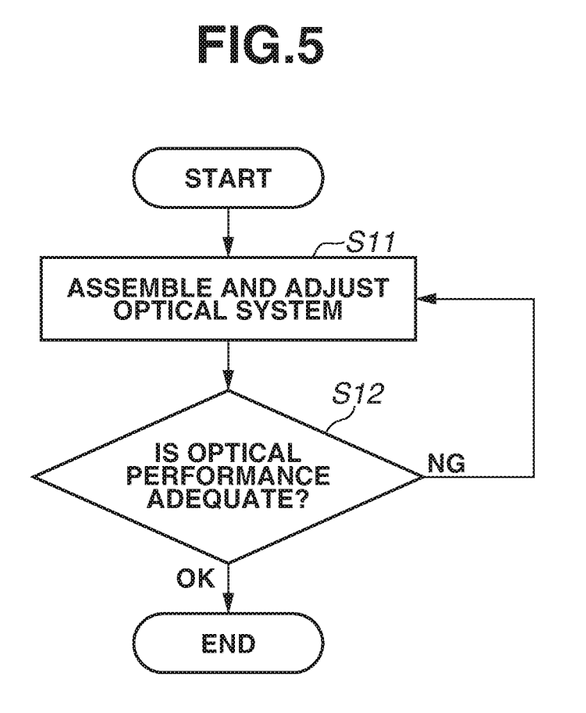
FIG. 5 is a flowchart illustrating a process of manufacturing an optical system.

FIG. 5 illustrates a method of manufacturing an optical system. In step S11, an optical system is assembled using a plurality of optical elements, and the position of each optical element is adjusted. In step S12, optical performance of the assembled and adjusted optical system is evaluated. In a case where the optical performance is inadequate (NG in step S12), the assembly and the adjustment are performed again. In the optical performance evaluation, the wavefront measurement apparatus 1 including the wavefront sensor 100 or 200 according to the first exemplary embodiment or the second exemplary embodiment can be used.

Figure 6:
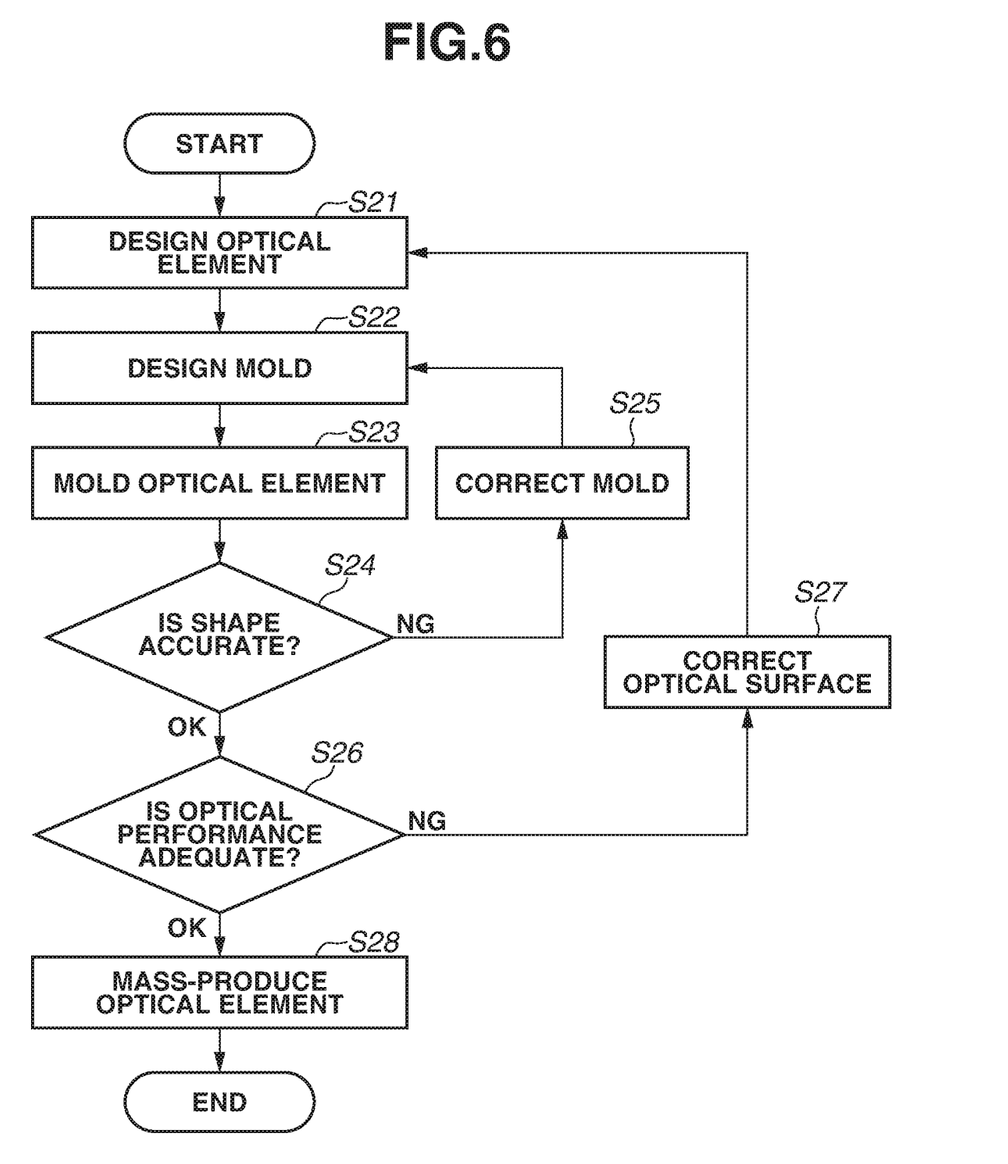
FIG. 6 is a flowchart illustrating a process of manufacturing an optical element.

FIG. 6 illustrates a method of manufacturing an optical element using molding. The optical element is manufactured as follows. In step S21, the optical element is designed. In step S22, a mold is designed. In step S23, the optical element is molded using the designed mold. In step S24, whether the shape of the molded optical element is accurate is evaluated.

In a case where the shape is inaccurate (NG in step S24), then in step S25, the mold is corrected, and the molding is performed again. On the other hand, in a case where the shape is accurate (YES in step S24), then in step S26, whether the optical performance of the optical element is adequate is evaluated. In a case where the optical performance is inadequate (NG in step S26), then in step S27, the optical element is re-designed with a corrected optical surface. On the other hand, in a case where the optical performance is adequate (YES in step S26), then in step S28, the molded optical element is mass-produced. In the optical performance evaluation, the wavefront measurement apparatus 1 can be used. The method of manufacturing the optical element is not limited to the molding and can also be applicable to the manufacturing of an optical element by grinding or polishing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-101008, filed May 25, 2018, which is hereby incorporated by reference herein in its entirety.

What is claimed is:

1. A wavefront sensor comprising:
   a splitting element including a splitting surface configured to split an incident light beam into a plurality of light beams;
   an image sensor including a light reception portion configured to receive the plurality of light beams; and
   a processing unit configured to calculate a wavefront of the incident light beam based on an intensity distribution of the plurality of light beams received by the image sensor,
   wherein the splitting element is either in direct contact with the image sensor or in contact with the image sensor via a plate glass,
   wherein the processing unit calculates the wavefront based on $T_k/N_k$ of each of at least one layer disposed between the splitting surface and the light reception portion, where $T_k$ is a thickness of each of the at least one layer, and $N_k$ is a refractive index of each of the at least one layer, and
   wherein, in a calculation of the wavefront, the processing unit corrects a relative positional deviation between the splitting element and the image sensor by calculating a rotation about a rotation axis.

2. The wavefront sensor according to claim 1, wherein the rotation axis is perpendicular to a light-incident-side surface of the image sensor.

3. The wavefront sensor according to claim 1, wherein the rotation axis is parallel to a light-incident-side surface of the image sensor.

4. A wavefront measurement apparatus comprising:
   a light projection system configured to cause a light beam from a light source to enter a test object; and
   the wavefront sensor according to claim 1 which is configured to receive an incident light beam from the test object and calculate a wavefront of the light beam.

5. A method of manufacturing an optical system, the method comprising:
   assembling an optical system; and
   evaluating optical performance of the optical system by measuring a wavefront aberration of the optical system using the wavefront measurement apparatus according to claim 4.

6. A method of manufacturing an optical element, the method comprising:
   processing an optical element; and
   evaluating optical performance of the optical element by measuring a wavefront aberration of the optical element using the wavefront measurement apparatus according to claim 4.

7. The wavefront sensor according to claim 1, wherein
   the splitting element is in direct contact with the light reception portion, and
   the processing unit calculates the wavefront based on $T_k/N_k$ of the splitting element.

8. The wavefront sensor according to claim 1, wherein
   the splitting element is in direct contact with the light reception portion, and
   the processing unit calculates the wavefront based on $T_k/N_k$ of the splitting element and the plate glass.

9. The wavefront sensor according to claim 8, wherein an angle formed by a surface of a plate glass that is on the light-incident side and a surface of the plate glass that is on a light-exiting side is 0.005 degrees or less.

10. The wavefront sensor according to claim 1, wherein
    the splitting surface is in direct contact with the light reception portion via the plate glass, and
    the processing unit calculates the wavefront based on $T_k/N_k$ of the plate glass.

11. The wavefront sensor according to claim 1, wherein
    the splitting element is in direct contact with a light transmission member provided on a light-incident side of the light reception portion, and
    the processing unit calculates the wavefront based on $T_k/N_k$ of the splitting element and the light transmission member.

12. The wavefront sensor according to claim 11, wherein the light transmission member includes at least one of a cover glass, a low-pass filter, and an infrared-cut filter.

13. The wavefront according to claim 1, wherein
    the splitting element is in contact with a light transmission member provided on a light-incident side of the light reception portion via the plate glass, and
    the processing unit calculates the wavefront based on $T_k/N_k$ of the splitting element, the plate glass, and the light transmission member.

14. The wavefront sensor according to claim 1, wherein
    the splitting surface is in contact with a light transmission member provided on a light-incident side of the light reception via the plate glass, and
    the processing unit calculates the wavefront based on $T_k/N_k$ of the plate glass and the light transmission member.

15. A wavefront sensor, comprising:
    a splitting element configured to split an incident light beam into a plurality of light beams;
    an image sensor configured to receive the plurality of light beams; and a processing unit configured to calculate a wavefront of the incident light beam based on an intensity distribution of the plurality of light beams received by the image sensor, wherein a light reception portion of the image sensor or a light transmission member provided on a light-incident side of the light reception portion is either in direct contact with the splitting element or in contact with the splitting element via a plate glass, wherein a thickness of the splitting element is defined as Tm, a refractive index of the splitting element is defined as Nm, a thickness of the plate glass is defined as Tp, a refractive index of the plate glass is defined as Np, a thickness of the light transmission member is defined as Tc, and a refractive index of the light transmission member is defined as Nc, wherein the processing unit calculates the wavefront based on Tm/Nm in a case where the splitting element is in direct contact with the light reception portion, wherein the processing unit calculates the wavefront based on Tm/Nm and Tc/Nc in a case where the splitting element is in direct contact with the light transmission member, wherein the processing unit calculates the wavefront based on Tp/Np in a case where the splitting element is in contact with the light reception portion via the plate glass, wherein the processing unit calculates the wavefront based on Tp/Np and Tc/Nc in a case where the splitting element is in contact with the light transmission member via the plate glass, and wherein, in a calculation of the wavefront, the processing unit corrects a relative positional deviation between the splitting element and the image sensor by calculating a rotation about a rotation axis.

16. The wavefront sensor according to claim 15, wherein the processing unit calculates the wavefront based on Tm/Nm and Tp/Np in a case where the splitting element is in contact with the light reception portion via the plate glass.

17. The wavefront sensor according to claim 15, wherein the processing unit calculates the wavefront based on Tm/Nm, Tp/Np, and Tc/Nc in a case where the splitting element is in contact with the light transmission member via the plate glass.

* * * * *